(12) United States Patent
Borufka et al.

(10) Patent No.: US 9,133,855 B2
(45) Date of Patent: Sep. 15, 2015

(54) ROTOR FOR A TURBO MACHINE

(75) Inventors: Hans Peter Borufka, Starnberg (DE); Frank Stiehler, Bad Liebenwerda (DE)

(73) Assignee: MTU AERO ENGINES GMBH, Munich (DE)

(*) Notice: Subject to any disclaimer, the term of this patent is extended or adjusted under 35 U.S.C. 154(b) by 660 days.

(21) Appl. No.: 13/294,255

(22) Filed: Nov. 11, 2011

(65) Prior Publication Data
US 2012/0121435 A1    May 17, 2012

(30) Foreign Application Priority Data

| Nov. 15, 2010 | (EP) | ................................ | 10191243 |
| Nov. 17, 2010 | (EP) | ................................ | 10191460 |
| Nov. 17, 2010 | (EP) | ................................ | 10191461 |
| Nov. 17, 2010 | (EP) | ................................ | 10191462 |

(51) Int. Cl.

| F01D 5/18  | (2006.01) |
| F04D 29/32 | (2006.01) |
| F01D 5/22  | (2006.01) |
| F01D 11/00 | (2006.01) |
| F04D 29/66 | (2006.01) |
| B23P 15/04 | (2006.01) |

(52) U.S. Cl.
CPC .............. *F04D 29/321* (2013.01); *F01D 5/187* (2013.01); *F01D 5/22* (2013.01); *F01D 11/006* (2013.01); *F04D 29/668* (2013.01); *Y02T 50/671* (2013.01); *Y02T 50/673* (2013.01); *Y02T 50/676* (2013.01); *Y10T 29/49318* (2015.01); *Y10T 29/49321* (2015.01)

(58) Field of Classification Search
CPC . F04D 15/0005; F04D 15/0011; F04D 15/02; F04D 15/0209; F04D 15/0245; F04D 15/0281; F04D 27/02; F04D 27/0207; F04D 27/0215; F04D 29/321; F04D 29/668; F05B 2220/40; F05B 2270/108; F05B 2270/1081; F01D 11/00; F01D 11/001; F01D 11/02; F01D 5/187; F01D 5/22; F01D 11/006; F05D 2230/23; F05D 2240/81; Y10T 29/49318; Y10T 29/49321
USPC .......... 415/1, 13, 20, 26–28, 52.1, 58.4, 101, 415/102, 115–116, 118, 144, 145, 151, 415/182.1, 203, 206, 174.4, 174.5, 173.7; 416/95, 96 R, 97 R, 193 A
See application file for complete search history.

(56) References Cited

U.S. PATENT DOCUMENTS

| 4,457,668 | A |   | 7/1984 | Hallinger |         |
| 5,232,339 | A | * | 8/1993 | Plemmons et al. | ........... 415/178 |

(Continued)

FOREIGN PATENT DOCUMENTS

| DE | 10361882 A1    | 7/2005 |
| DE | 102008055567 A1 | 7/2009 |

(Continued)

*Primary Examiner* — Dwayne J White
*Assistant Examiner* — Alexander White
(74) *Attorney, Agent, or Firm* — Barlow, Josephs & Holmes, Ltd.

(57) ABSTRACT

The invention relates to a rotor (10) for a turbo machine, in particular for an aircraft turbine, with rotating blades (12) that are joined to a basic rotor body (16), whereby at least one channel (22) extending between the high-pressure side (HD) and the low-pressure side (ND) of rotor (10) radially underneath a blade platform (18) of at least one rotating blade (12) is provided, whereby a slope of a principal axis of extension (H) of channel (22) relative to an axis of rotation (D) of rotor (10) has the same sign as a slope of a principal axis of extension (R) of a radially inner boundary of the flow channel of rotor 10. In addition, the invention relates to a turbo machine having a rotor (10) as well as to a method for manufacturing a rotor (10) for a turbo machine.

16 Claims, 3 Drawing Sheets

(56) References Cited

U.S. PATENT DOCUMENTS

| | | | |
|---|---|---|---|
| 5,310,318 A * | 5/1994 | Lammas et al. | 416/219 R |
| 5,431,542 A * | 7/1995 | Weisse et al. | 416/219 R |
| 5,957,660 A * | 9/1999 | Evans et al. | 416/97 R |
| 2005/0232780 A1 | 10/2005 | Newman | |

FOREIGN PATENT DOCUMENTS

| | | |
|---|---|---|
| DE | 102008049171 A1 | 4/2010 |
| EP | 1880789 A1 | 1/2008 |
| EP | 2230382 A2 | 9/2010 |

* cited by examiner

ROTOR FOR A TURBO MACHINE

BACKGROUND OF THE INVENTION

The invention relates to a rotor for a turbo machine, in particular for an aircraft turbine, a turbo machine with a rotor, as well as a method for manufacturing a rotor for a turbo machine.

In turbo machines, such as aircraft turbines, for example, which are used in a number of variants in aircraft, but also in different types of aircraft and in stationary applications, continually higher temperatures in internal combustion chamber(s) are targeted in order to obtain an improved efficiency. In the high-pressure part of the aircraft turbine that is connected downstream of the internal combustion chamber, all open surfaces of guide vanes and rotating blades as well as of other components that lay open are therefore subjected to temperatures that can lie partially in the region of the melting point of the materials used. In order to be able to operate an aircraft turbine at a temperature that is as high as possible, the components and particularly the vanes and blades subjected to the hot gas flow are thus cooled.

The rotating blades of currently used rotors usually have at least one blade shroud, which forms the radially inner boundary of the flow channel of an associated turbo machine. For example, a bladed rotor, which has a plurality of channels as well as a plurality of slots underneath blade platforms of its rotating blades, is known from EP 2 230 382 A2. Each slot essentially extends radially between one of the channels and a surface of the blade platform in question that is facing the flow channel. The slots have a non-linear course, whereby a radially inner first angle and a radially outer second angle are created relative to the axis of rotation of the rotor. The radially inner angle and the radially outer angle are thus basically selected as different from one another. In contrast to the slots, the channels run in an axis-parallel manner to the axis of rotation of the rotor. With this combination of channels and slots, the channels serve for relieving stress and prevent the slots from expanding in the rotor material.

Another rotor designed with an integral construction as a so-called bladed disk (BLISK) can be taken, for example, from US 2005/0232780 A1. During the operation of the rotor, the hot operating gases heat the blade shroud and correspondingly the region in which the disk-shaped or ring-shaped basic rotor body is joined to the rotating blade. This adversely affects the mechanical properties of the rotor and reduces its service life. In the region between the blade feet of the rotating blades and the blade shroud. Radially beneath the blade shroud, the rotating blades parallel to the axis of rotation of the rotor have running channels that extend between a high-pressure side and a low-pressure side of the rotor and particularly serve for providing cooling air to the rotating blades.

Viewed as a disadvantage in the known rotor is thus the circumstance that this rotor requires a relatively large radial structural space. In addition, the rigidity of the rotor can be increased only by introducing additional mass, which leads to an axial widening of the rotor, however, and introduces strong geometric restrictions.

SUMMARY OF THE INVENTION

An object of the present invention is to provide a rotor for a turbo machine that has an improved ratio of mass to rigidity. Further objects of the invention consist of providing a turbo machine with a rotor of this type as well as a method for manufacturing this type of rotor for a turbo machine.

The objects are accomplished by a rotor of the present invention, a turbo machine of the present invention, as well as by a method of the present invention. Advantageous embodiments of the rotor can also be viewed as advantageous embodiments of the turbo machine and of the method.

In a rotor according to the invention, which makes possible an improved provision of cooling air while simultaneously the rotor possesses a weight that is as little as possible, it is provided that a slope of a principal axis of extension of the channel relative to an axis of rotation of the rotor has the same sign as a slope of a principal axis of extension of a radially inner boundary of the flow channel of the rotor. In other words, the course of the channel is fitted to the radially inner course of the flow channel along the axis of rotation of the rotor, whereby the slopes of the principal axis of extension of the channel and of the principal axis of extension of the radially inner boundary of the flow channel can be selected basically the same or of different dimensions, but always of a magnitude greater than zero. If the rotor is built into a turbo machine, a housing part of the turbo machine usually defines the radially outer boundary of the flow channel of the usually ring-shaped flow channel (annular space). By adapting the course of the channel and of the flow channel to one another, more uninterrupted material can be made available in the circumferential direction of the rotor in the joining region for rigidifying the rotor, in contrast to rotors known from the prior art in which each channel runs parallel to the axis of rotation of the rotor. In other words, the radially outer, uninterrupted edge of the solid rotor disk can be placed radially further outward relative to the axis of rotation. This edge is also designated the "life rim" in this case. If the edge is moved out from the horizontal by a formal tilting of the channel and can follow the geometry of the radially inner boundary of the annular space, the bearing part of the rotor disk, which is homogeneous and rotationally symmetrical, is enlarged. In contrast to a rotor with conventional, horizontally designed channels, more uninterrupted material is therefore made available in the circumferential direction as a rigidifying disk structure and enlarges the homogeneous, bearing part of the rotor or of its disk-shaped or ring-shaped basic rotor body. The more the rotor material is disposed radially outward, i.e., in the vicinity of the flow channel or the annular space of the turbo machine, the more rigid the rotor becomes, for example, rigid against bending vibrations. According to the principle of inertia, the effect of a mass is a function of its distance from the axes of inertia, whereby the effect increases exponentially with distance. Thus, on the one hand, the vibration behavior of the rotating blade-basic rotor body system—in particular with respect to bending and coupling vibrations—will be improved, while on the other hand, significant savings in weight and an optimizing of the structure can be achieved, by which means the rotor can also be designed in a particularly compact manner with simultaneously improved mechanical properties. The joining region between basic rotor body and rotating blade also can be better adapted to the geometry of the flow-channel or of the annular space of the associated turbo machine. By adapting the principal extension axes of the channel and the radially-inner flow channel boundary to one another and making them not parallel to the axis of rotation of the rotor, each principal extension axis intersects the axis of rotation of the rotor formally in at least one projection plane at precisely one point. Within the framework of the invention, the channel is thus not a cause of functional limitations. Thus, the channel for a rotor with joined rotating blades can be designed, for example, as a relief borehole and/or as a cooling channel.

In an advantageous embodiment of the invention, it is provided that the at least one channel is designed closed around the outer circumference. In this case, during the operation of the rotor, flow losses can be minimized and hot gas intrusions into the channel in question can be reliably avoided. It is particularly provided that radial slots opening up into the channel or similar material weaknesses are not provided, so that the rotor is designed mechanically robust and has a correspondingly long service life.

In another advantageous embodiment of the invention, it is provided that the principal extension axis of the channel is disposed at a first angle to the axis of rotation, whereby the first angle in a first longitudinal sectional plane of the rotor is measured relative to a line running parallel to the axis of rotation. In other words, it is provided that the principal extension axis of the channel is designed tilted in the X-Y plane of the rotor or of the associated turbo machine relative to the axis of rotation of the rotor. In this case, depending on the purpose and the configuration of the channel, both a particularly good introduction of cooling air as well as a particularly high strain relief of the rotor and rotating blade regions lying radially above the channel are made possible.

Thus, in another embodiment, it has been shown to be advantageous if the first angle lies between 2° and 80°, in particular between 10° and 20°. An angle between 2° and 80° is understood to be, in particular, 2°, 4°, 6°, 8°, 10°, 12°, 14°, 16°, 18°, 20°, 22°, 24°, 26°, 28°, 30°, 32°, 34°, 36°, 38°, 40°, 42°, 44°, 46°, 48°, 50°, 52°, 54°, 56°, 58°, 60°, 62°, 64°, 66°, 68°, 70°, 72°, 74°, 76°, 78° or 80°, as well as corresponding intermediate angles. A particularly good introduction of cooling air and/or strain relief of the rotor and rotating blade regions lying radially above the channel is then particularly possible when the first angle is 10°, 11°, 12°, 13°, 14°, 15°, 16°, 17°, 18°, 19° or 20°. The first angle here can be determined basically in the counter-clockwise or clockwise direction, i.e., it can be formally positive (e.g.)+15° or negative (e.g. −15°).

In another advantageous embodiment of the invention, it is provided that the principal extension axis of the channel is disposed at a second angle to the axis of rotation, whereby the second angle in a second longitudinal sectional plane of the rotor standing perpendicular to the first longitudinal sectional plane is measured relative to a line running parallel to the axis of rotation. In other words, it is provided that the principal extension axis of the channel is designed tilted or rotated relative to the axis of rotation of the rotor in the X-Z plane of the rotor or of the associated turbo machine. This represents an alternative or additional possibility in order to achieve a particularly good introduction of cooling air and/or a particularly high strain relief of the rotor and rotating blade regions lying radially above the channel. In this case, it can be provided that the principal axis of extension of the channel is tilted as a function of the direction of rotation of the rotor.

Further advantages result if the second angle is between 2° and 80°, in particular between 10° and 20° An angle between 2° and 80° in this case is understood to be, in particular, 2°, 4°, 6°, 8°, 10°, 12°, 14°, 16°, 18°, 20°, 22°, 24°, 26°, 28°, 30°, 32°, 34°, 36°, 38°, 40°, 42°, 44°, 46°, 48°, 50°, 52°, 54°, 56°, 58°, 60°, 62°, 64°, 66°, 68°, 70°, 72°, 74°, 76°, 78° or 80°, as well as corresponding intermediate angles. A particularly good introduction of cooling air and/or a particularly high strain relief of the rotor and rotating blade regions lying radially above the channel is possible when the second angle is 10°, 11°, 12°, 13°, 14°, 15°, 16°, 17°, 18°, 19° or 20°. The second angle here can also be determined basically in the counter-clockwise or in the clockwise direction, i.e., it can be formally positive (e.g.)+15° or negative (e.g.) −15°.

In another advantageous embodiment of the invention, it is provided that the channel is designed as a relief borehole and/or as a cooling air channel. As a relief borehole, the channel produces a tangential interruption of the rotor, by which means the rotor regions lying radially above the channel are relieved of strain. If the channel is designed alternatively or additionally as a cooling air channel, it may be provided that the channel is fluidically coupled with inner cooling channels of the rotating blade, so that cooling air can enter through the channel into the rotating blade.

In another advantageous embodiment of the invention, it is provided that the rotor is joined to the drum radially below the channel. In this way, the rigidity of the drum (so-named "drum") can be utilized in order to increase the rigidity of the rotor, by which means a particularly advantageous vibration behavior, in particular with respect to coupling vibrations of basic rotor body and rotating blades is achieved. In addition to a construction that is lighter in weight with a simultaneously more rigid total system, a shorter radial construction of stators of an associated turbo machine is also made possible in this way, since the drum can be radially disposed near the gas channel. One can therefore advantageously dispense with large and voluminous sealing elements—for example, so-called honeycombs, labyrinth seals or the like. In this case, the drum is joined to the rotationally symmetrical, homogeneous part of the basic rotor body as close as possible under the radially outer, uninterrupted edge of the solid basic rotor body and can be basically disposed on the low-pressure side or the high-pressure side of the rotor. Based on the configuration of the channel according to the invention, the drum can be joined radially particularly far outside, which contributes to the mentioned structural rigidity, in contrast to the prior art. In another embodiment of the invention, it is provided that the drum is joined to the rotor disk via a so-called wing. The wing can also be joined to the basic rotor body radially further outside in comparison to the prior art, so that the rigidity of the entirety of the rotating blade-basic rotor body system is correspondingly improved.

In another advantageous embodiment of the invention, it is provided that relative to the axis of rotation of the rotor, the slopes of the principal axes of extension of several or of all channels of the rotor possess the same sign as the slope of the principal axis of extension of the radially inner flow-channel boundary. In this way, the introduction of cooling air and the rigidity of the rotor can be additionally increased, the weight of the rotor can be further reduced, and radially outer-lying blade regions can be better relieved of strain.

A further improvement for introducing cooling air is made possible in another embodiment, in that at least two channels and/or adjacent channels have different cross-sectional geometries. This permits a particularly targeted influencing of the strain relief and/or of the cooling-air flow as well as an improved setting of the temperature gradient forming during the operation of the rotor, as a function of the configuration of the channel.

A particularly high mechanical rigidity as well as a particularly advantageous vibration behavior of the rotor are achieved in another embodiment of the invention, due to the fact that the principal axes of extension of all channels lie on a conical surface. By showing all principal axes of extension of the channels, in other words, conical lines, and having the same slope, the rotor is particularly light in weight with a simultaneous particularly higher mechanical rigidity.

In another advantageous embodiment of the invention, it is provided that the rotating blades are joined to the basic rotor body in a detachable manner or cohesively. Here, the rotor can be manufactured in a particularly flexible way in a mounted construction and/or in an integral BLISK (Bladed Disk) or BLING (Bladed Ring) construction. In the case of cohesively joined rotating blades, the channel, by its arrangement and alignment, defines the radially outer edge of the uninterrupted, solid basic rotor body. In the case of assembled rotors with rotating blades detachably fastened to the basic rotor body, the channel can be disposed preferably between two disk cusps.

In another advantageous embodiment of the invention, it is provided that at least one rotating blade comprises a radially inner blade shroud as a radially inner flow-channel boundary and/or a radially outer blade shroud as a radially outer flow-channel boundary. In this way, a defined boundary of the flow channel is possible.

Another aspect of the invention relates to a turbo machine having a rotor according to one of the preceding embodiment examples. The features resulting therefrom and their advantages can be taken from the preceding descriptions.

Another aspect of the invention relates to a method for manufacturing a rotor for a turbo machine, in particular for an aircraft turbine in which rotating blades are joined to a basic rotor body, whereby at least one channel is formed extending between the high-pressure side and the low-pressure side of the rotor, radially underneath a blade platform of at least one rotating blade. According to the invention, an improved ratio of mass to rigidity of the rotor is achieved in that the at least one channel is formed in such a way that a slope of a principal axis of extension of the channel, relative to an axis of rotation of the rotor, has the same sign as a slope of a principal axis of extension of a radially inner boundary of the flow channel of the rotor. The flow channel here can basically have the form of an annular space. The features resulting therefrom and their advantages can also be taken from the preceding descriptions. The channel can be manufactured, for example, by machining the rotor. Other manufacturing methods are also conceivable, however. In addition, it can be provided that several channels are formed in the described way.

BRIEF DESCRIPTION OF THE DRAWINGS

Further features of the invention result from the claims, the example of embodiment, as well as on the basis of the drawings. The features and combinations of features named above in the description, as well as features and combinations of features named in the following for the example of embodiment are not only applicable in the combination indicated in each case, but are also applicable in other combinations or by themselves, without departing from the scope of the invention. Herein:

DETAILED DESCRIPTION OF THE INVENTION

Figure 1:
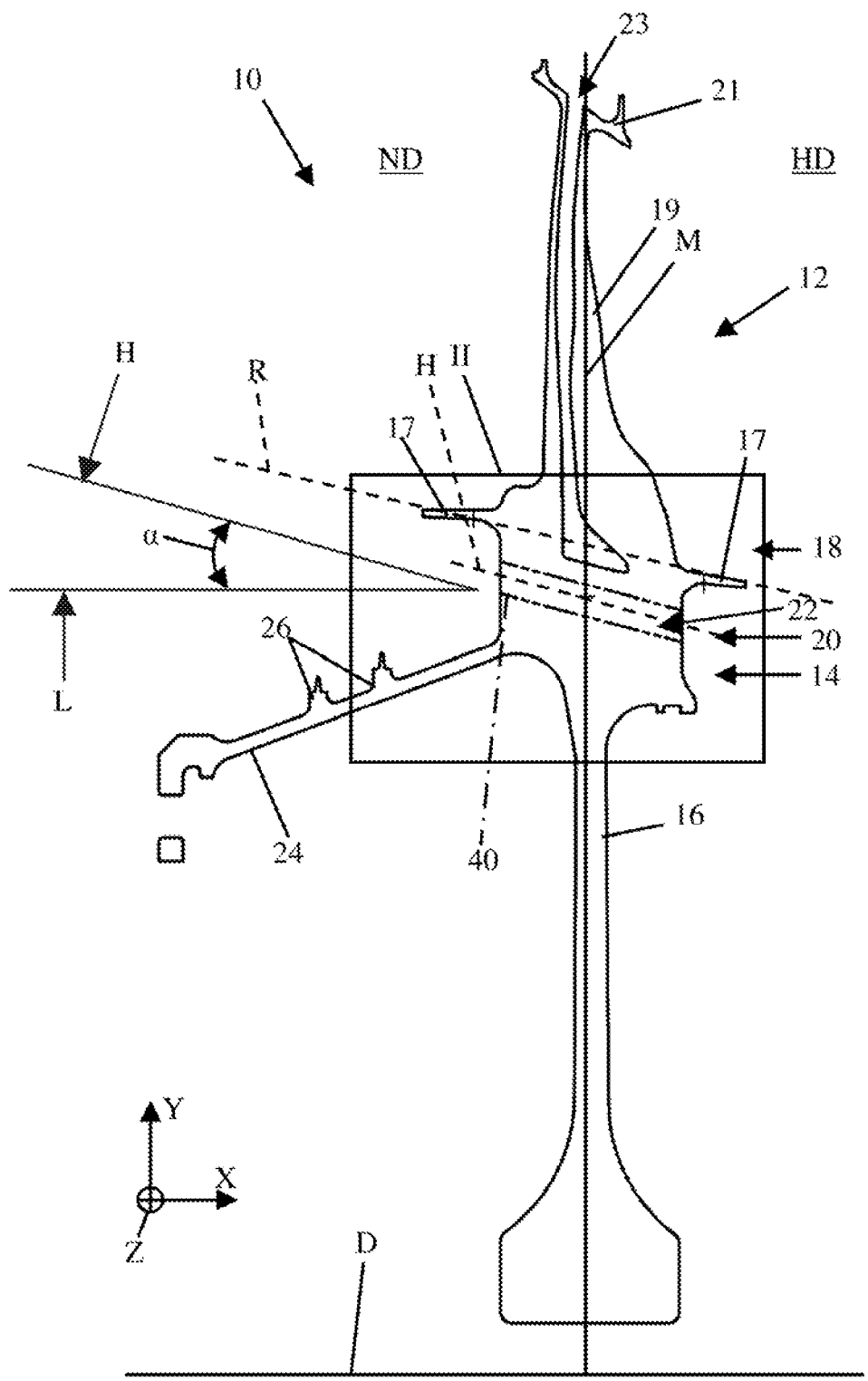
FIG. 1 shows a schematic lateral sectional view of a rotor according to the invention.
Figure 2:
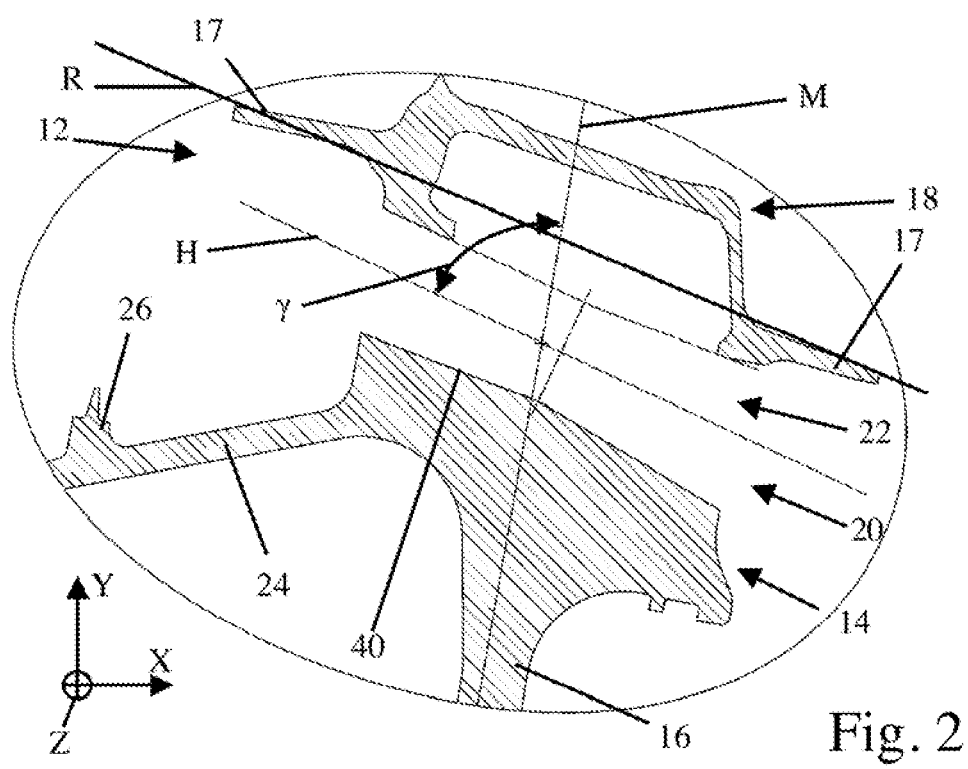
FIG. 2 shows an enlarged representation of the detail II shown in FIG. 1.
Figure 3:
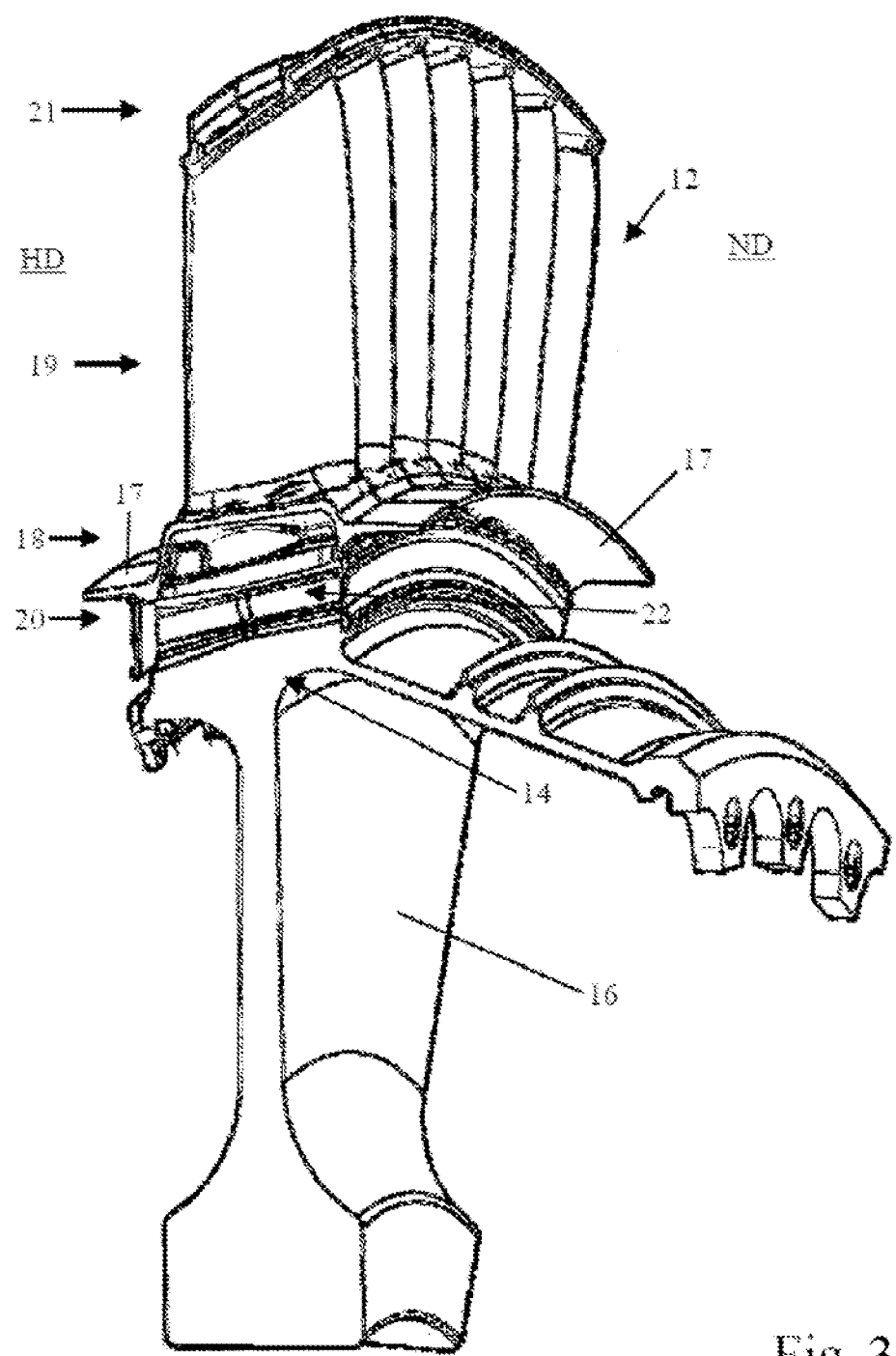
FIG. 3 shows a perspective sectional view of a rotor having a plurality of blades.

FIG. 1 shows a schematic lateral sectional view of a rotor 10 according to the invention for an aircraft turbine (not illustrated) and will be explained together with FIG. 2 in the following, and FIG. 2 shows an enlarged representation of the detail II shown in FIG. 1. A rotor 10, which is formed presently as a so-called BLISK, comprises several rotating blades 12. Each rotating blade 12 is joined cohesively to a basic rotor body 16 via its blade foot 14. Between a blade platform 18 and the blade foot 14, rotating blade 12 has a channel 22 extending between the high-pressure side HD and the low-pressure side ND of rotor 10 in the region of its blade neck 20. The underside of channel 22 in this case defines the radially outer edge 40 of the solid, uninterrupted rotor disk 16, in which this edge 40 is also designated a "life rim". In the present example of embodiment, rotor 10 has one channel 22 per rotating blade 12. Basically, however, more or fewer channels 22 than rotating blades 12 may also be provided. In addition, in the example of embodiment shown, each channel 22 is formed closed around its outer circumference. Moreover, rotor 10 is formed with no radial slots or the like extending between channels 22 and rotating blade platform 18, by which means increased flow losses during operation as well as material weaknesses potentially shortening the service life will be avoided.

The principal axis of extension H of channel 22 in this case is disposed tilted relative to an axis of rotation D of rotor 10 and thus does not run parallel to axis of rotation D. In addition, the slope of the principal axis of extension H has the same sign as the slope of a principal axis of extension R of a radially inner flow-channel boundary of rotor 10. The radially inner flow-channel boundary in the exemplary embodiment shown in this case is formed by a radially inner blade shroud 17 associated with blade platform 18, whereby the principal axis of extension R of the radially inner flow-channel boundary runs through the upper corner points of blade shroud 17 lying opposite one another. The course of channel 22 therefore follows the course of the flow channel. In the present example, the slopes of the principal axis of extension H of channel 22 and the principal axis of extension R differ in magnitude, so that the principal axis of extension H and the principal axis of extension R formally intersect at a point in at least one projection plane. Alternatively, the principal axes of extension H, R may run parallel to one another, but do not run parallel to the axis of rotation D.

The principal axis of extension H of channel 22 is disposed at a first angle α to the axis of rotation D, whereby the first angle α, in a first longitudinal sectional plane, i.e., in the illustrated X-Y plane of rotor 10, can be measured relative to a line L running parallel to the axis of rotation D. In the present example of embodiment, the first angle α thus amounts to 15°. Correspondingly, a complementary angle γ amounts to 75°; this angle can be measured relative to a central axis M of rotor 10 standing perpendicular to the axis of rotation D, which can be seen in FIG. 2.

An increase of the degrees of freedom in optimizing the structure of rotor 10 is achieved by the configuration of channel 22 according to the invention. Channel 22 and thus the edge or "life rim" 40 are formed, as already mentioned, so that they follow the geometry of the flow channel or of the annular space. The bearing region of basic rotor body 16, which is a homogeneous and rotationally symmetrical region, is correspondingly enlarged radially outward in this way. In contrast to a conventional rotor with a channel guided horizontally or parallel to the axis of rotation D, more uninterrupted material is thus available as a rigidifying disk structure in the circumferential direction in the case of rotor 10 according to the invention, by which means a better mass-rigidity ratio of rotor 10 is achieved. In this case, the more material there is lying radially outside, thus in the vicinity of the flow channel or annular space of the aircraft engine, the more rigid rotor 10 will be, e.g., against bending vibrations. The present invention thus utilizes the principle of inertia, according to which the effect of a mass increases exponentially as a function of distance from its inertial axes. This also concerns the resistance characteristics of rotor 10. In the case of a conventional rotor with a conventional, horizontally designed channel or life rim, in addition, the radially widest inner-lying course of the gas channel in a turbine stage determines the maximum radial positioning of the life rim or of the channel that can be realized. This limitation is eliminated by rotor 10 according to the invention.

Alternatively or additionally, it can be provided that the principal axis of extension H of channel 22 is disposed at a second angle β (not shown) to the axis of rotation D, whereby the second angle in a second longitudinal sectional plane of rotor 10 standing perpendicular to the first longitudinal sectional plane is measured relative to the line (not shown) running parallel to the axis of rotation D. In other words, the principal axis of extension H can be angled relative to the axis of rotation D running in the X direction in the X-Z plane of the rotor. Thus, principal axes of extension H can be provided that run skewed relative to the axis of rotation D. In addition, it can be provided that the principal axes of extension H of all channels 22 lie formally on a conical surface, whereby the axis of rotation D of rotor 10 forms the cone axis.

As can be seen in FIG. 2, the cross section of channel 22 constricts, proceeding from the high-pressure side HD to the low-pressure side ND. It can also be basically provided that many or all channels 22 are formed in a circular-cylindrical manner or possess elliptical, polygonal, irregular cross-sectional geometries or geometries that vary over their length. In addition, it can be provided that adjacent channels 22 have different cross-sectional geometries in order to be able to particularly precisely adjust a temperature gradient, which is adjusted during the operation of the aircraft turbine, in the connection region of the blade feet 14 or in the region of channel 22.

Each rotating blade 12 additionally comprises a blade element 19 connecting to blade platform 18 as well as a radially outer blade shroud 21, which forms a radially outer flow channel boundary. In addition, each rotating blade 12 has an inner cooling channel 23. In the example of embodiment shown, the cooling channel 23 is not fluidically coupled to channel 22, so that channel 22 functions as a pure relief borehole and the radially outer-lying blade regions are relieved of strain. Alternatively or additionally, it can be provided that channel 22 is used for through-passage of cooling air. In another alternative embodiment, channel 22 can be fluidically coupled to cooling channel 23, so that cooling air can cross from channel 22 into cooling channel 23.

In addition, a drum 24 with two sealing elements 26 is connected to the basic rotor body 16. This makes possible the integration of the drum's rigidity into the rigidity of rotor 10 and thus an advantageous layout of coupling vibrations between the disk-shaped basic rotor body 16 and rotating blades 12. Rotor 10 can therefore be rigidified without an increase in mass. Drum 24 is joined to the rotationally symmetrical, homogeneous part of basic rotor body 16 radially underneath edge 40. Based on the principal axis of extension H following the course of the annular space, an increased structural freedom results relative to the arrangement and alignment of geometries or components adjacent to rotor 10, such as, for example, drum 24. By joining drum 24 at the level of blade feet 14 or underneath edge 40, the rigidity of drum 24 is advantageously coupled to basic rotor body 16. Since the joining between drum 24 and basic rotor body 16 lies radially far outside, the drum rigidity particularly greatly influences the rigidity of the entire system when the rotating blade and basic rotor body vibrations are coupled to it. Rotor 10 according to the invention can thus be designed lighter in weight and simultaneously more rigid in comparison to the prior art. Shorter radial constructions of stators (not shown) of the aircraft engine can also be realized, since drum 24 can be placed radially near the flow channel. Thus, for example, large sealing elements 26 (e.g., "honeycombs") can be dispensed with, for which reason further advantages can be achieved, in particular with respect to the efficiency of the aircraft turbine.

The parameter values given in the documents for the definition of measurement conditions for characterizing specific properties of the subject of the invention within a framework of deviations—for example, due to measurement errors, system errors, DIN (a German industrial standard) tolerances and the like are also to be viewed as being encompassed by the scope of the invention.

It would be appreciated by those skilled in the art that various changes and modifications can be made to the illustrated embodiments without departing from the spirit of the present invention. All such modifications and changes are intended to be covered by the appended claims.

What is claimed is:

1. A rotor (10) for a turbo machine, in particular for an aircraft turbine, having rotating blades (12) that are each joined via a respective blade foot to a basic rotor body (16), being provided with at least one cooling air channel (22) extending between a high-pressure side (HD) of the rotor and a low-pressure side (ND) of the rotor, each at least one cooling air channel being (10) radially underneath a blade platform (18) of at least one rotating blade (12) and radially above the respective blade foot of the respective blade, wherein a slope of a principal axis of extension (H) of each at least one cooling air channel (22) relative to an axis of rotation (D) of the rotor (10) has the same sign as a slope of a principal axis of extension (R) of a radially inner boundary of a flow channel of the rotor 10;

wherein the rotating blades (12) and the basic rotor body (16) are joined in a bladed disk (BLISK) construction or a bladed ring (BLING) construction, so that the basic rotor body (16) is solid and uninterrupted radially inwardly of the at least one cooling air channel (22), the at least one cooling air channel (12) defining a radially outer edge of the solid basic rotor body (16).

2. The rotor (10) according to claim 1, wherein the at least one cooling air channel (22) is formed closed around its outer circumference.

3. The rotor (10) according to claim 1, wherein the principal axis of extension (H) of each at least one cooling air channel (22) is disposed at a first angle (α) to the axis of rotation (D), whereby the first angle (α) in a first longitudinal sectional plane (X-Y) of the rotor (10) is measured relative to a line (L) running parallel to the axis of rotation (D).

4. The rotor (10) according to claim 3, wherein the first angle (α) lies between 2° and 80°, in particular, between 10° and 20°.

5. The rotor (10) according to claim 1, wherein the principal axis of extension (H) of the at least one cooling air channel (22) is disposed at a second angle (β) to the axis of rotation (D), whereby the second angle (β) in a second longitudinal sectional plane (X-Z) of the rotor (10) standing perpendicular to a first longitudinal sectional plane is measured relative to a line running parallel to the axis of rotation (D).

6. The rotor (10) according to claim 5, wherein the second angle (β) lies between 2° and 80°, in particular, between 10° and 20°.

7. The rotor (10) according to claim 1, wherein each at least one cooling air channel (22) is formed as a relief borehole.

8. The rotor (10) according to claim 1, wherein the rotor is joined to a drum (24) radially underneath the at least one cooling air channel (22).

9. The rotor (10) according to claim 1, wherein, relative to the axis of rotation (D) of the rotor (10), the slopes of the principal axes of the extension (H) of several or of all the cooling air channels (22) of the rotor (10) possess the same sign as the slope of the principal axis of the extension (R) of the radially inner flow channel boundary.

10. The rotor (10) according to claim 1, wherein the at least one cooling air channel (22) is at least two cooling air channels (22) or an adjacent pair of cooling air channels, wherein the at least two cooling air channels (22) and/or adjacent pair of cooling air channels (22) have different cross-sectional geometries from each other.

11. The rotor (10) according to claim 9, wherein the principal axes of extension (H) of all of the cooling air channels (22) lie on a conical surface.

12. The rotor (10) according to claim 1, wherein at least one rotating blade (12) comprises a radially inner blade shroud (17) as a radially inner flow-channel boundary and/or a radially outer blade shroud (21) as a radially outer flow-channel boundary.

13. The rotor (10) according to claim 1, wherein the rotor is configured for use in a turbo machine.

14. The rotor (10) according to claim 1, wherein the rotating blades (12) are joined to the basic rotor body (16) in a detachable manner or cohesively.

15. The rotor (10) according to claim 1, wherein the at least one cooling air channel (22) is formed closed around its outer circumference between the respective blade foot and the respective blade platform, and is formed in a circular-cylindrical manner.

16. A method for manufacturing a rotor (10) for a turbo machine, in particular for an aircraft turbine in which rotating blades (12) are each joined via a respective blade foot to a basic rotor body (16) wherein the rotating blades (12) and the basic rotor body (16) are joined in a bladed disk (BLISK) construction or a bladed ring (BLING) construction, whereby at least one cooling air channel (22) extending between a high-pressure side (HD) of the rotor and a low-pressure side (ND) of the rotor (10) is formed radially underneath a blade platform (18) of at least one rotating blade (12) and radially above the respective blade foot of the respective at least one rotating blade whereby the basic rotor body (16) is solid and uninterrupted radially inwardly of the at least one cooling air channel (22), the at least one cooling air channel (22) defining a radially outer edge of the solid basic rotor body (16), comprising the step of:

forming the at least one cooling air channel (22) so that a slope of a principal axis of extension (H) of the respective cooling air channel (22), relative to an axis of rotation (D) of the rotor (10), has the same sign as a slope of a principal axis of an extension (R) of a radially inner boundary of the flow channel of the rotor 10.

* * * * *